Figure 1:
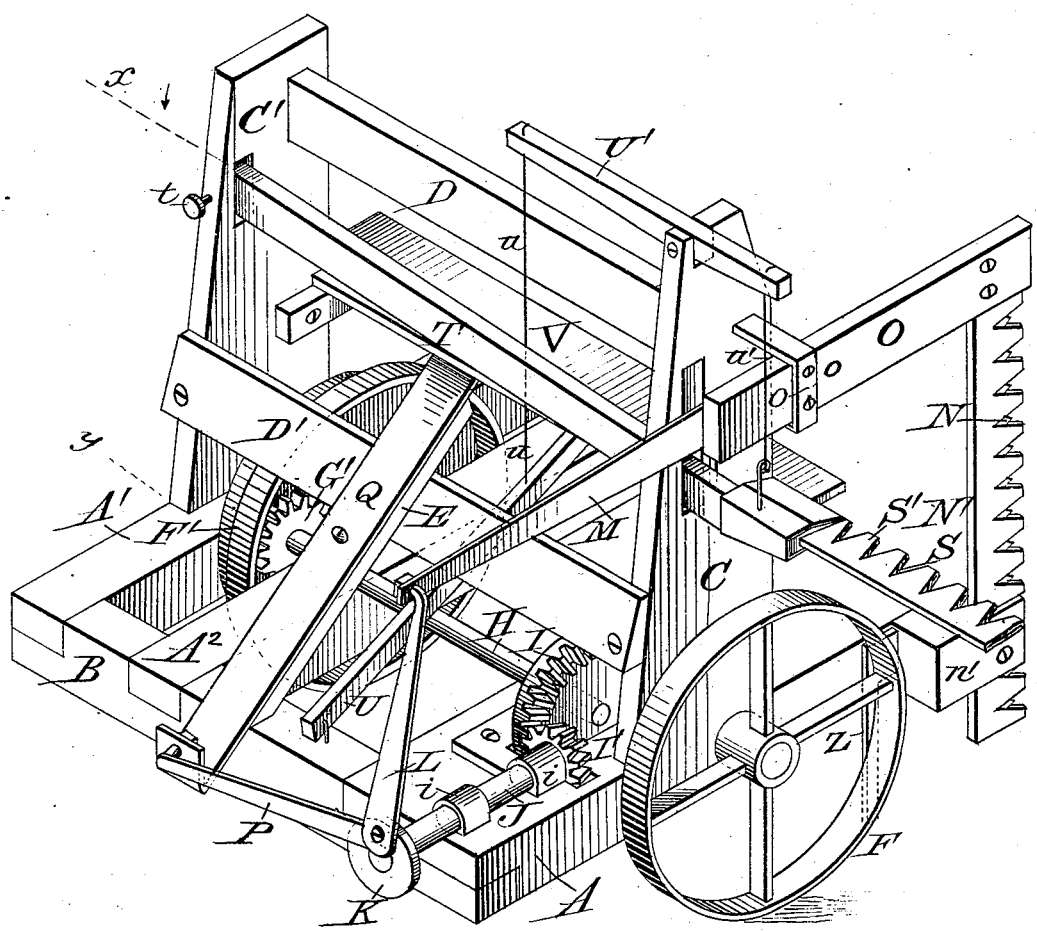

(No Model.) 3 Sheets—Sheet 1.

J. V. LATTNER.
COMBINED HEDGE TRIMMER AND MOWER.

No. 253,724. Patented Feb. 14, 1882.

Witnesses:
H. H. Schott
A. R. Brown

Inventor
Jacob V. Lattner
per C. H. Watson & Co. Attorneys.

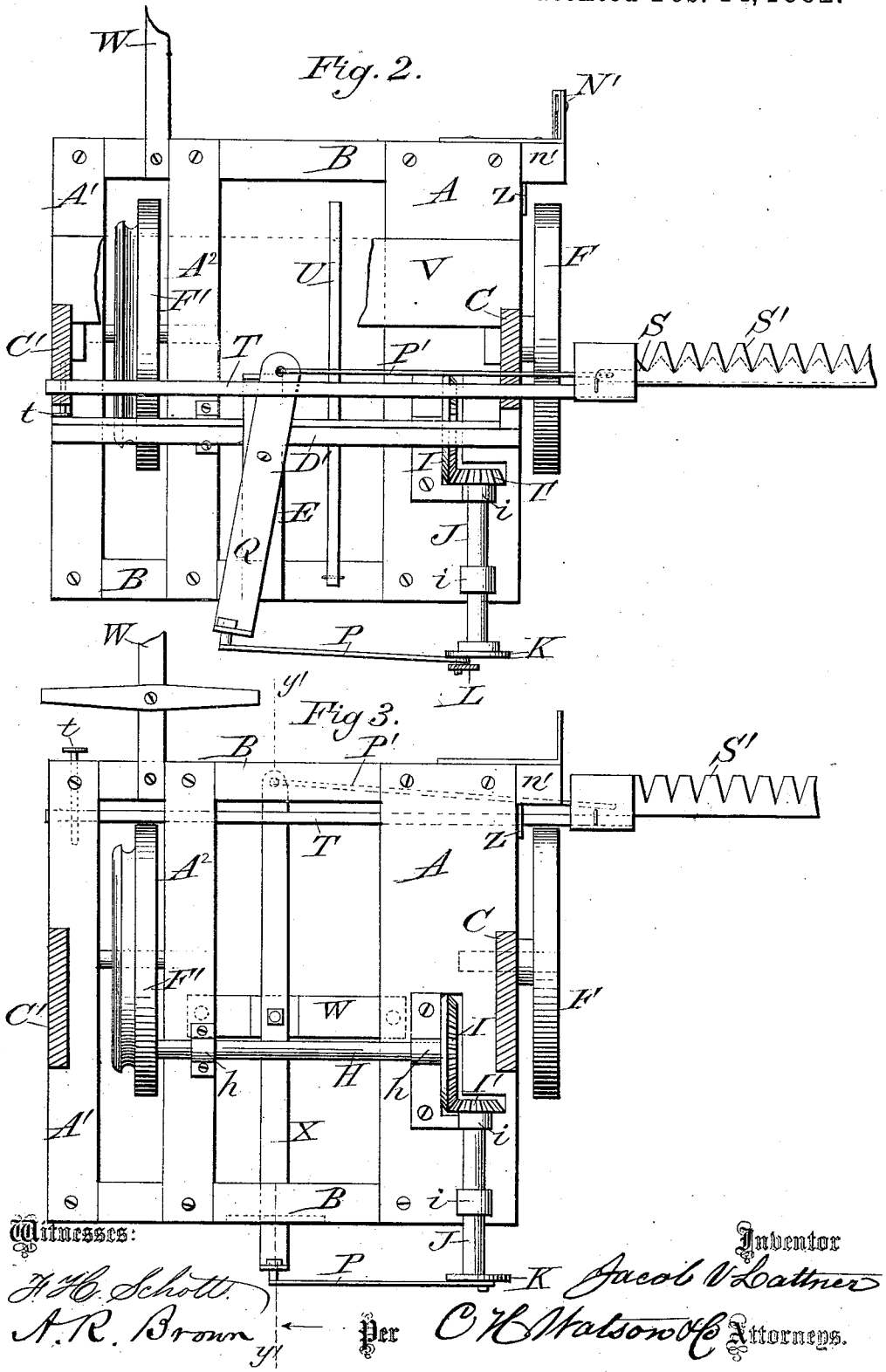

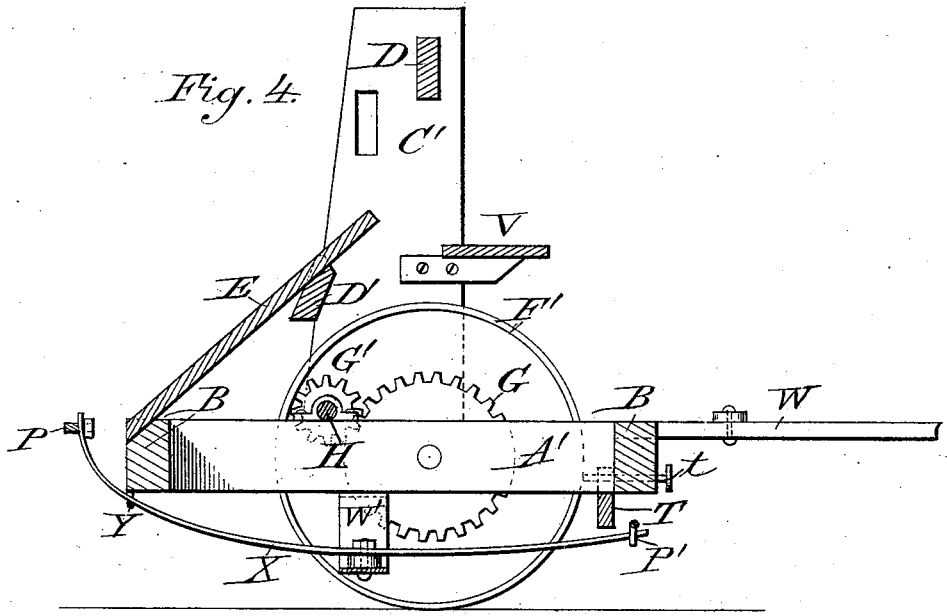

United States Patent Office.

JACOB V. LATTNER, OF WAXAHACHIE, TEXAS.

COMBINED-HEDGE TRIMMER AND MOWER.

SPECIFICATION forming part of Letters Patent No. 253,724, dated February 14, 1882.

Application filed November 19, 1881. (No model.)

*To all whom it may concern:*

Be it known that I, JACOB V. LATTNER, a citizen of the United States, residing at Waxahachie, in the county of Ellis and State of Texas, have invented certain new and useful Improvements in a Combined Hedge-Trimmer and Mower, of which the following is a specification, reference being had therein to the accompanying drawings.

This invention relates to certain new and useful improvements in that class of combined hedge-trimmers and mowers in which the side and top of a hedge are trimmed at the same time; and it consists in the construction and arrangement of the frame-work, the driving mechanism or gearing, and the cutting devices or knives, as will be hereinafter more fully set forth.

The object of my invention is to provide a simple, cheap, and effective means of trimming a hedge, and also for making the machine so that it can be changed into a mower without materially changing the construction and with but little trouble or time.

In the accompanying drawings, which fully illustrate my invention, Figure 1 is a perspective view of the machine as a hedge-trimmer. Fig. 2 is a top view of the same, partly in section on the line $x$ of Fig. 1. Fig. 3 is a plan and section on the line $y$ of Fig. 1, showing the machine as a mower. Fig. 4 is a section on line $y'$ $y'$ of Fig. 3.

Like letters indicate like parts.

The frame of my machine is composed of the sides A A', center piece, A², cross-pieces B B, and slotted standards C C', which are connected near their upper ends by a bar, D. A cross-bar, D', is attached to the rear of the slotted standards C C', and serves as a brace for said standards, also as a support for the inclined bar E, which extends from the rear cross-piece to a point above said bar D'.

F F' are the drive-wheels, which are suitably hung upon the bars A A' by separate axles. Rigidly attached to the same shaft with and in the interior of the wheel F' is the main gear-wheel G, which meshes with a smaller gear-wheel, G', mounted upon one end of a shaft, H, which is hung in bearings $h$ $h$, attached to the bars A A² of the frame. Upon the other end of the shaft H is rigidly attached a beveled-gear wheel, I, which meshes with a small beveled-gear wheel, I', mounted upon the horizontal shaft J. This shaft J, which is hung in bearings $i$ $i$, has attached to its rear end a crank-wheel, K.

A pitman, L, whose upper end is bent at right angles and threaded for the attachment of a nut, is attached to the crank-wheel K by means of the crank-pin. The upper end of this vertical pitman is inserted and secured in a hole in the rear end of the horizontal lever M, which is pivoted to the inner side of the horizontal bar O. The forward end of the lever M is connected with the upper end of a vertical cutter or knife, N, which reciprocates vertically in the vertical stationary cutter-bar N'. The top of the said cutter-bar N' is secured to the forward end of the horizontal bar O, and its lower portion is secured to the front cross-bar of the frame by means of a brace, $n'$. The knife N and stationary cutter-bar or casing N' are slightly inclined outward toward the top, so that in trimming the bottom of the hedge will be left broader than the top.

The bar O is attached to the cross-bar D by means of the strap $o$. This strap $o$ holds the bar O away from the cross-bar D, and thus leaves room for the horizontal lever M to play freely upon its pivot.

To the pin on the crank-wheel K is attached one end of a horizontal pitman, P, which has its other end turned inward at right angles and threaded for the attachment of a nut, by which it is secured to an inclined lever, Q, Figs. 1 and 2, which rests upon and is pivoted to the inclined bar E. To the upper end of the lever Q is attached one end of a horizontal rod, P', which projects through the forward slot in the standard C, and whose other end is attached to one end of the horizontal knife or cutter S, which reciprocates in a horizontal toothed casing or stationary cutter-bar, S'.

T is a bar which projects through the rear slots in the standards C C', and is pivoted to the standard C' by means of the pivot-pin $t$. To one end of this pivoted bar T is attached the inner end of the toothed casing or cutter-bar S'.

To the center of the lever U, whose rear end is pivoted to the rear cross-bar, B, is attached a rod, $u$, which connects said lever U with the lever U', which is pivoted to the top of the standard C. To the other end of the lever U' a rod, u', is attached, which connects said lever U' with the pivoted bar T. The forward end of the lever U extends to within reach of the driver, so that it can be easily operated either by hand or foot. By this means the knife or cutter S can be raised or lowered as desired. The knife or cutter S, if desired, may be inclined upwardly from its inner end, so that the top or apex of the hedge in trimming will be left higher than the sides.

V is the driver's seat, which is suitably attached to or supported upon the standards C C'.

W is the tongue or pole of the machine.

If desired, the driving-wheel F can be made adjustable up and down, so as to overcome any inequalities in the ground, by means of a cranked axle and lever, &c., or any other suitable device or devices.

The driving-wheel F' is constructed with a broad periphery and a hollow center. By this means the gear-wheels G G' can be set inside of said wheel, and thus save considerable space.

The operation of my improved hedge-trimmer and mower is as follows: When the drive-wheels F F' are revolved motion will be transmitted to the crank-wheel K by means of the gear-wheels G G', shaft H, beveled-gear wheels I I', and shaft J, and as said crank-wheel is revolved it will communicate motion to the vertical knife or cutter N by means of the vertical pitman L and pivoted horizontal lever M, and also to the horizontal knife or cutter S by means of the pitman P, lever Q, and bar or rod P'. It will readily be seen that by this arrangement of devices an alternately-reciprocating motion of the knives or cutters N S will be obtained—that is, while the vertical knife N is cutting the horizontal knife S is just getting into position to cut, and vice versa.

Thus far I have only described my invention as relating to hedge-trimmers; but the machine can be readily changed into a very effective mower, and with but little trouble, as will be hereinafter more fully set forth.

To the under sides of the bars A A² a downwardly-curved iron strap, W', is attached. A lever, X, Figs. 3 and 4, is pivoted upon this strap or support W', and is held in place thereon by means of a bolt and nut. The staple Y on the rear cross-bar, B, serves as a support and a guide for the rear end of the lever X, and prevents it from having too much lateral play.

In order to make the machine operative as a mower, I remove the pivoted bar T from its former position, and with it the horizontal toothed casing or cutter-bar S', knife S, and horizontal connecting-rod P', and insert the end of the bar T in a recess or slot formed in the under side of the piece A' near its front end, and secure it in place therein by means of the pivot-pin t. I then attach the free end of the horizontal rod P' to the front end of the lever X, and by attaching an additional piece to the rod u' extend it until it connects the lever U and the pivoted bar T. After having detached the horizontal pitman P from its connection with the inclined lever Q, I connect it with the rear end of the lever X, and the machine is now in position to be operated as a mower.

A bar or brace, Z, is attached to the outer side of the piece A, and serves as a check or brace to prevent the horizontal knife S from being forced too far back, which might occur if not thus prevented.

If desired, the vertical knife or cutter N may be removed by detaching the pitman L from its connection with the crank-wheel K and removing said pitman L and lever M, and with them the cutter N.

It will be seen that the cutter S is operated, when used as a mower, by the pitman P, which causes the lever X to vibrate from side to side.

Having thus described my invention, what I claim as new, and desire to secure by Letters Patent, is—

1. The combination, with the rear cross-piece, B, standard C, and adjustable and detachable bar T, carrying cutter S and cutter-bar S', of the lever U, pivoted to the rear cross-piece, the lever U', pivoted to the standard, and the rods u w', connecting the lever U' with the lever U and bar T, respectively, whereby the latter is raised, substantially as shown and described.

2. The combination, with the side pieces, A A', and vertical guard Z, of the horizontal bar T, pivoted in a recess in the side piece A', and supported by a rod connecting with the lever U on the standard C, and the horizontally-reciprocating cutter S, inclosed in the stationary cutter-bar S', and provided with suitable operating mechanism, substantially as shown and described.

3. The combination of the side pieces, A A', standards C C', transverse bar T, carrying horizontal cutter S and cutter-bar S', longitudinal bar O, supporting vertical cutter N and cutter-bar N', the crank-wheel K, the pitman P, rod P', and lever Q, connecting the horizontal cutter with said wheel, the pitman L and lever M, connecting the crank-wheel with the vertical cutter, and suitable gearing for transmitting motion from the drive-wheels to the crank-wheel, whereby the revolution of the latter will cause the vertical and horizontal cutters to reciprocate alternately, substantially as shown and described.

In testimony whereof I affix my signature in presence of two witnesses.

JACOB V. LATTNER.

Witnesses:
G. H. EAGLE,
WILEY N. STREND.